US008690310B1

(12) United States Patent
Schmaelzle et al.

(10) Patent No.: US 8,690,310 B1
(45) Date of Patent: Apr. 8, 2014

(54) COMPOSITE DRUM FOR SOLID INK MARKING SYSTEM

(71) Applicants: Xerox Corporation, Norwalk, CT (US); Palo Alto Research Center Incorporated, Palo Alto, CA (US)

(72) Inventors: Philipp Schmaelzle, Los Altos, CA (US); Bruce E. Thayer, Spencerport, NY (US); Palghat S. Ramesh, Pittsford, NY (US)

(73) Assignees: Xerox Corporation, Norwalk, CT (US); Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 13/759,569

(22) Filed: Feb. 5, 2013

(51) Int. Cl.
*B41J 2/01* (2006.01)
*G01D 15/00* (2006.01)

(52) U.S. Cl.
USPC .......... 347/101; 346/138

(58) Field of Classification Search
USPC .......... 347/101, 102, 103; 346/138; 399/303
See application file for complete search history.

(56) References Cited

U.S. PATENT DOCUMENTS

| | | | | |
|---|---|---|---|---|
| 4,982,207 A * | 1/1991 | Tunmore et al. | .............. | 346/138 |
| 5,253,021 A * | 10/1993 | Aslam et al. | .............. | 430/47.4 |
| 5,365,261 A | 11/1994 | Ozawa et al. | | |
| 5,771,054 A | 6/1998 | Dudek et al. | | |
| 5,805,191 A * | 9/1998 | Jones et al. | .............. | 347/103 |
| 6,247,809 B1 | 6/2001 | Kashiwagi et al. | | |
| 6,276,793 B1 * | 8/2001 | Kazakos et al. | .............. | 347/102 |
| 6,494,570 B1 * | 12/2002 | Snyder | .............. | 347/103 |
| 6,554,414 B2 | 4/2003 | Ylitalo et al. | | |
| 6,679,597 B2 | 1/2004 | Ohsawa et al. | | |
| 8,256,886 B2 * | 9/2012 | Harris et al. | .............. | 347/101 |
| 8,277,015 B2 | 10/2012 | Fujikura | | |
| 2009/0202936 A1 | 8/2009 | Morelissen | | |
| 2012/0013691 A1 | 1/2012 | Harris et al. | | |

* cited by examiner

*Primary Examiner* — Anh T. N. Vo
(74) *Attorney, Agent, or Firm* — Hollingsworth Davis, LLC

(57) ABSTRACT

A print drum subassembly suitable for ink jet printing applications includes a composite print drum including an outer shell having a wall thickness in a range of about 1.5 mm to about 15 mm and a thermal conductivity greater than about 200 W/m-K disposed around a hollow core having wall thickness in a range of about 4 mm to about 30 mm and a thermal conductivity less than about 10 W/m-K. A radiant heater is arranged within the hollow core and is configured to heat the outer shell without substantially heating the hollow core.

20 Claims, 4 Drawing Sheets

COMPOSITE DRUM FOR SOLID INK MARKING SYSTEM

TECHNICAL FIELD

This application relates generally to techniques that involve solid ink marking using transfix print drums. The application also relates to components, devices, systems, and methods pertaining to such techniques.

BACKGROUND

Many types of printers use a "transfix" drum that serves as an intermediate print media. The transfix drum is kept at an elevated temperature for proper function of the ink transfer process. Transfix drums have been made of metal having a significant thermal capacity which makes the drum slow to be heated "on demand" whenever prints are requested. On the other hand however, if the drum is kept at the elevated temperature at all times, the heat lost from its large surface is substantial and leads to significant power consumption in idle mode. Thus, massive metal drum printers may be either power hungry or slow responding, which can limit their competitiveness in today's markets.

SUMMARY

Some embodiments discussed in the disclosure are directed to a printing system that includes a print drum assembly. The print drum assembly comprises a composite print drum that includes an outer shell with a thermal conductivity greater than about 200 W/m-K and a thickness in a range of about 1.5 mm to about 15 mm. The outer shell is disposed around a hollow core; the hollow core having a thermal conductivity less than about 10 W/m-K. A heater is configured to heat the outer shell of the composite print drum. For example, the hollow core may be substantially transmissive to radiation produced by the heater, e.g., radiation having a wavelength in a range of about 1000 to about 5000 nm. The printing system further includes a print head comprising ink jets configured to selectively eject ink toward the print drum according to predetermined pattern. A transport mechanism provides relative movement between the print drum and the print head.

In some configurations, the hollow core has an outer diameter in a range of about 100 mm to about 1000 mm and a wall thickness in a range of about 4 mm to about 30 mm.

According to some aspects, the heater comprises a radiant heater disposed within the hollow core. For example, the heater may be a filament heater or a halogen bulb.

A radiation absorbent layer can be disposed between the hollow core and the outer shell, the radiation absorbent layer configured to absorb radiation produced by the radiant heater. The radiation absorbent layer can include one or more of black chromium, black high temperature paint, anodized aluminum or infrared absorbing adhesive, for example. The thermally insulating layer may comprise an aerogel, e.g., a silica containing aerogel. For example, the thermally insulating layer may have thermal conductivity less than about 0.03 W/m-K.

The drum assembly can be configured to provide an increase in temperature of the outer shell of about 30 degrees C. in less than about 100 seconds and to maintain a temperature variation of less than about 0.01 degrees C. per mm across an outer surface of the outer shell.

In some implementations, the outer surface of the outer shell has a surface texture having an average surface roughness ranging from about 0.05 microns to about 0.7 microns, and a bearing area ranging from about 2% to about 100% at a cut depth ranging from about 0.1 microns to about 1 micron, wherein a relationship between the bearing area and the cut depth is selected from one or more sets comprising: the bearing area ranging from about 7% to about 46% at the cut depth ranging from about 0.1 microns to about 0.2 microns; the bearing area ranging from about 18% to about 74% at the cut depth ranging from about 0.2 microns to about 0.3 microns; the bearing area ranging from about 32% to about 82% at the cut depth ranging from about 0.3 microns to about 0.4 microns; the bearing area ranging from about 47% to about 86% at the cut depth ranging from about 0.4 microns to about 0.5 microns; the bearing area ranging from about 60% to about 89% at the cut depth ranging from about 0.5 microns to about 0.6 microns; and the bearing area ranging from about 70% to about 95% at the cut depth ranging from about 0.6 microns to about 0.7 microns.

The surface texture may have an average maximum profile peak height of less than about 0.6 microns or ranging from about 0.2 microns to about 0.6 microns, for example. In some implementations, the surface texture has an average pit size ranging from about 0.1 microns to about 20 microns, and an average pit density ranging from about 1000 per millimeter square to about 30,000 per millimeter square.

DESCRIPTION OF THE DRAWINGS

Like reference numbers refer to like components; and

Drawings are not necessarily to scale unless otherwise indicated.

DESCRIPTION OF VARIOUS EMBODIMENTS

Embodiments described herein involve approaches that enable "on demand" heating of the surface of the transfix drum of a solid ink marking system, e.g., ink jet printer, with a relatively short time-constant. Some approaches discussed herein involve composite print drums that involve a non-thermally conductive core within a thermally conductive shell. In some cases, the core is made of a material that transmits a substantial amount of radiation in the infrared range. The composite drums described below allow direct heating of the drum surface through the core while reducing the thermal mass of the drum surface to the outer metal shell. The thermal resistance connecting the drum surface to the thermal mass of the drum core allows for heating times and heat uniformity to be maintained within specified parameters.

Figure 1A:
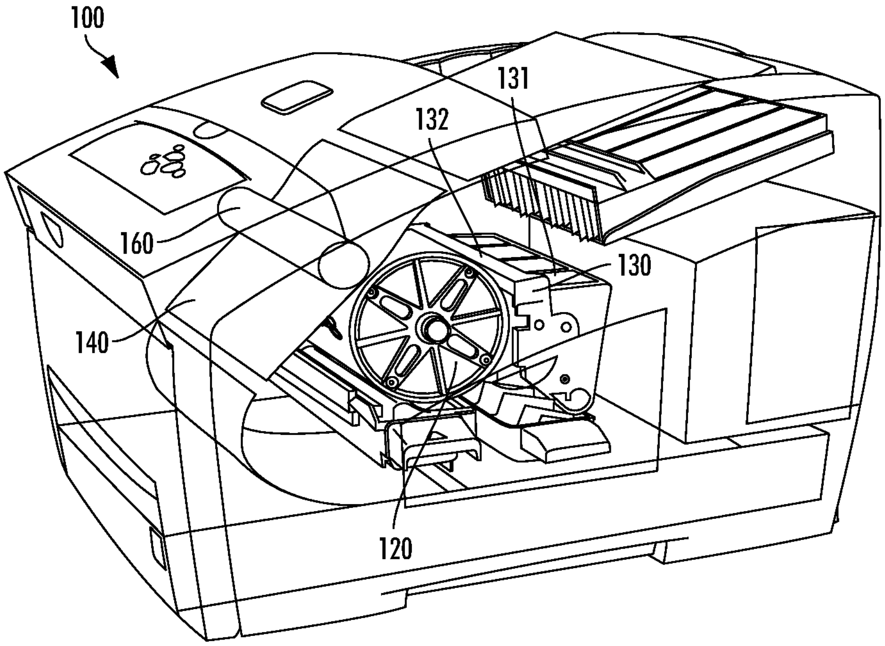
FIGS. 1A and 1B provide internal views of portions of a solid ink marking system that includes a composite transfix drum in accordance with various embodiments.
Figure 1B:
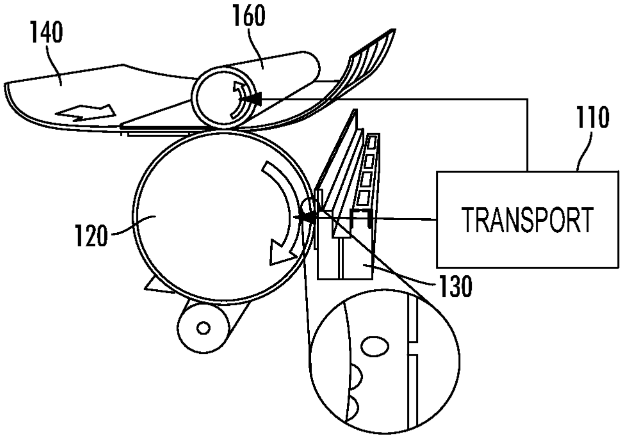

FIGS. 1A and 1B provide internal views of portions of an exemplary solid ink marking system 100 that incorporates a composite drum assembly as discussed herein. The printer 100 includes a transport mechanism 110 that is configured to move the drum 120 relative to the print head 130 and to move the paper 140 relative to the drum 120. The print head 130 may extend fully or partially along the length of the drum 120 and includes a number of ink jets. As the drum 120 is rotated by the transport mechanism 110, ink jets of the print head 130 deposit droplets of ink though ink jet apertures onto the drum

120 in the desired pattern as illustrated in the inset circle in FIG. 1B. The transport mechanism may be capable of automatically feeding sheets of paper 140 from an input tray onto the drum and automatically withdrawing printed sheets of paper from the drum to an output tray. As each sheet of paper 140 travels over the drum 120, the pattern of ink on the drum 120 is transferred to the paper 140 through a pressure nip 160.

Figure 2A:
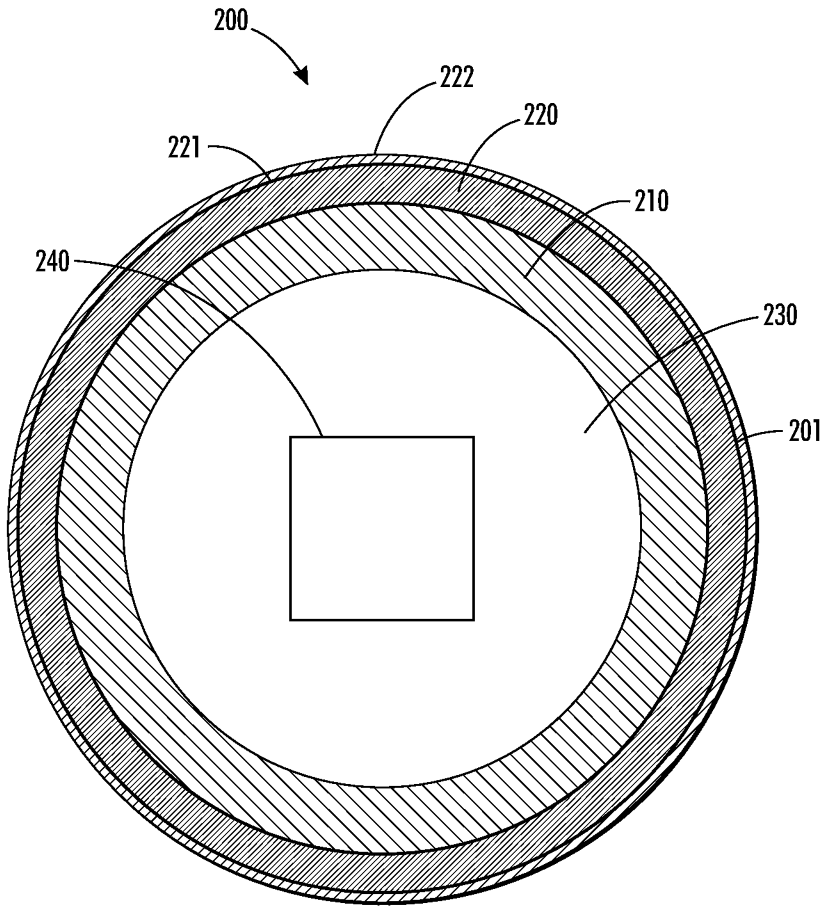
FIGS. 2A and 2B show end and side cross sectional views, respectively, of a composite transfix drum according to various embodiments.
Figure 2B:
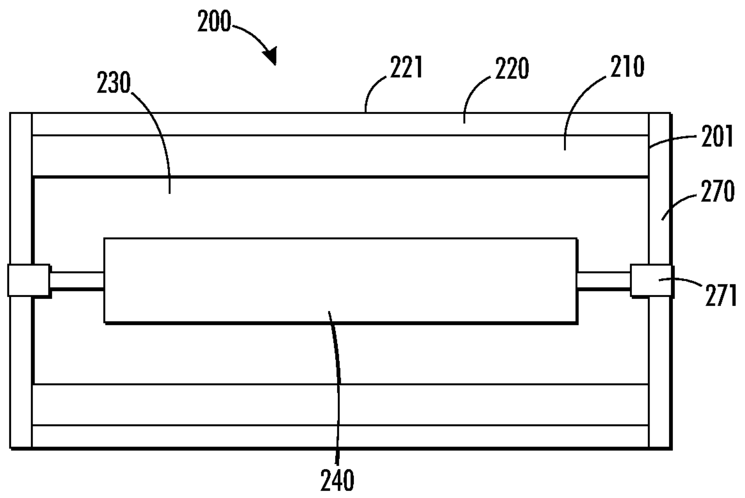

FIGS. 2A and 2B show end and length-wise cross sectional views, respectively, of a drum assembly 200 including a composite drum 201 in accordance with some embodiments. In this example, the composite drum 201 comprises a cylindrical core 210 and an outer shell 220 disposed around the cylindrical core 210. In some cases, the core 210 has an outer diameter of about 100 mm to about 1000 mm. In some cases, the core 210 has a wall thickness of about 4 mm to about 30 mm. The core 210 is made of one or more thermally non-conductive materials. In some cases, the core 210 is thermally non-conductive and transmissive to infrared radiation. For example, the core 210 may comprise glass, Schott glass, plastic, and/or ceramic. For example, the material used for the core 210 may have thermal conductivity less than about 10 W/m-K. In the embodiment shown in FIGS. 2A and 2B, the core 210 is a hollow cylinder that has a central cavity 230.

A shell 220 is disposed around the core 210 and is made of one or more materials that have relatively high thermal conductivity when compared to the thermal conductivity of the core 210. For example, the material of the shell 220 may have thermal conductivity greater than about 200 W/m-K. Many metals, e.g., aluminum, copper, etc., or metal alloys, e.g., aluminum 3003 are suitable for the shell. The core 210 provides structural support for the shell 220, allowing the shell to be thinner when compared with a hollow cylindrical metal drum without a core. In various configurations, the shell may have a thickness of between about 1.5 mm to about 15 mm.

In legacy solid ink marking systems, flexing of hollow metal drums due to pressure from the nip roller may cause metal fatigue failures near the supporting endbells. Thus, hollow metal drums need to have thicknesses sufficient to prevent the flexing which leads to fatigue failures of the drums. For 3003 aluminum the stress must be less than about 58 MPa to prevent fatigue failures. As a competing constraint, the thickness of these drums provides a significant thermal mass that makes it more difficult to achieve fast heating of the drum surface.

Composite drums as discussed herein make use of a thick structural core which is thermally non-conductive in conjunction with a relatively thin, thermally conductive shell. The composite drum 201 shown in FIGS. 2A and 2B that includes the core 210 and shell 220 arrangement allows for faster heating of the drum surface 221 when compared to legacy hollow metal drums without a core. Furthermore, the rigid core of the composite drums discussed herein can be designed to prevent a significant amount of flexing of the drum when the drum is subjected to pressure from the nip and the resulting friction torques, resulting in fewer metal fatigue failures. The structural requirements of the core are thus decoupled from the thermal requirements of the shell.

During operation of the printer, the shell 220 of the composite drum 201 is heated to facilitate transfer of ink from the drum surface 221 to paper or other print media. The heating may be performed before printing (pre-heat), during printing, and after printing (post-heat). For example, upon startup of the printer, the outer surface 221 of the shell 220 can be heated from room temperature (about 25 degrees C.) to about 55 degrees C. in less than about 100 seconds. In other words, the drum assembly 200 can be configured to provide an increase in temperature at the surface 221 of the shell 220 of about 30 degrees C. in less than 100 seconds. During operation, the drum assembly 200 can be designed to maintain temperature uniformity across the surface 221 of the shell 220 within about ±0.01 degrees C./mm as the drum 201 rotates at about 4 cm/sec to about 200 cm/second.

The drum assembly 200 includes a heater 240 configured to heat the surface 221 of the composite drum 201. FIGS. 2A and 2B show an optional location of a heater 240 disposed within the internal cavity 230 of the core 210. The heater 240 may comprise a filament heater or halogen bulb, for example. The heater 240 can emit radiation, for example, within the visible and/or infrared wavelength ranges, e.g., about 1000 nm to about 5000 nm, which heats the shell 220. The core 210 of the composite drum 201 can be designed to substantially transmit radiation in this wavelength range, where substantial transmission means transmission greater than about 70% over at least a portion of the wavelength range of radiation emitted by the heater 240. The radiation emitted by the heater 240 is transmitted through the core 210 and heats the shell 220, e.g., according to specifications set forth above. The radiation transmission of the core 210 for the wavelengths emitted by the heater 240 is sufficient to heat of the shell 220 through the core 210 without substantially heating the thermal mass of the core 210.

For example, a radiation transmissive core may comprise Schott glass which has suitable structural rigidity and transmission characteristics for visible and infrared wavelengths. The term “glass” as used herein encompasses materials that have a large range of physical properties. Despite the association of the term “glass” with fragility, properly chosen and integrated glass components, such as the transmissive core for the composite drum discussed herein, can be used as load bearing structural members.

Stationary radiant heaters disposed within the internal cavity of the drum assembly including the composite drum are cost effective and do not need rotating electrical power connections. In some cases reflectors (not shown) may be used within and/or outside the core cavity 230. Internal reflectors can be used to direct the radiation emitted by the heater 240 toward the drum, e.g., toward certain portions of the drum. External heat reflectors may be used to reflect heat emanating from surface 221 away from or toward the surface 221. In certain cases, the use of reflectors can contribute to temperature uniformity of the shell surface 221. Additionally, or alternatively, one or more fans may be used to reduce the likelihood of overheating of the shell. In some configurations, overheating of the outer shell occurs when the temperature of the outer shell is greater than about 65 degrees C. One or more fans may be located within the core cavity or outside the drum. Thermistors located at the ends of the shell and/or at other locations in or on the composite drum can provide sensor inputs to a thermal control system that is configured to control the temperature of the drum, for example, by varying the fan rpm and/or duty cycle.

FIG. 2B shows a circular end plate 270 attached to the composite drum 201. In some implementations, the circular end plate 270 is attached to the core 210 using a suitable glue, e.g., a glue suitable for bonding glass. The glue should be heat resistant at temperatures applicable for a heated drum used for solid ink marking (e.g., about 55 degrees C.). The material and/or configuration used for the end plate 270 can be selected to take into account expected coefficient of thermal expansion mismatches between the plate 270 and the core 210. The circular end plate 270 interfaces mechanically to a bearing 271 that is stationary within the internal cavity 230 of the core 210 and supports the internal heater 240.

Figure 3:
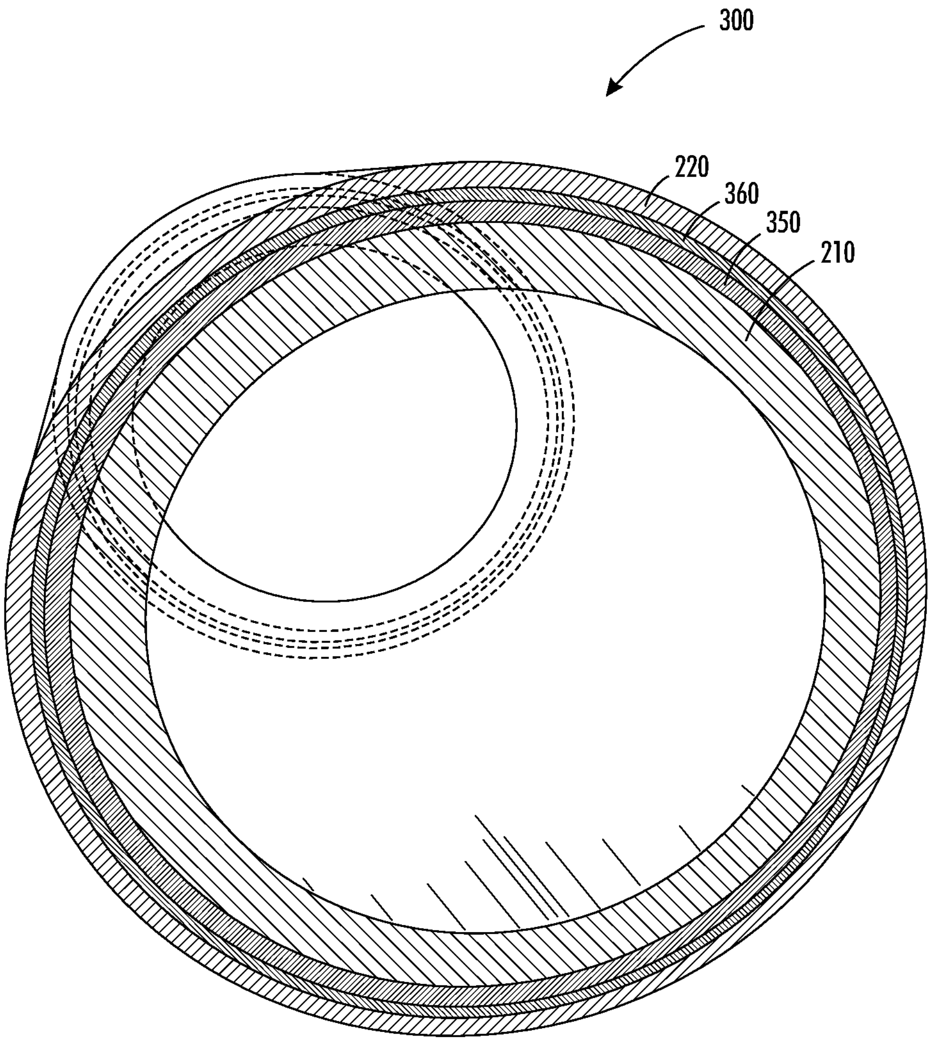
FIG. 3 illustrates a composite drum having various optional layers according to various embodiments.

Additional functional layers may be inserted between the shell 220 and the core 210 as illustrated in FIG. 3. For example, the composite drum assembly 300 shown in FIG. 3 includes optional layers 350, 360 arranged between the core 210 and the shell 220. These optional layers assist in rapid heating of the shell 220. Rapid heating can be enhanced by a thermally insulating layer 350 that provides an amount of thermal isolation between the shell 220 and the core 210. Although the core 210 has low thermal conductivity, a thermal insulator layer 350 can serve to further prevent the core 210 from acting as a significant thermal mass during rapid heating operations. In some applications, the thermally insulating layer 350 may comprise an aerogel such as a silica aerogel. For example, the thermally insulating layer 350 may have a thermal conductivity less than about 0.03 W/m-K.

Depending on the materials and/or configuration of the composite drum assembly, the absorption of the radiation and heating of the shell may not be efficient, causing longer warm-up time for the surface of the shell. Radiation heat transfer can be improved by using a radiation absorber layer 360 disposed between the shell 220 and the core 210. If an insulator layer 350 is used, the absorber layer may be disposed between the shell 220 and the insulator layer 350. In some cases, the absorber layer may comprise a layer of black high temperature paint, anodized aluminum, infrared absorbing adhesive and/or may comprise a layer of black chromium.

One or both of the insulator layer and the absorber layer may be patterned. Patterned layers can have regions of functional material (insulator or absorber) interspersed with non-functional (non-insulators or non-absorber) materials. Patterned layers can target certain areas where thermal insulation and/or thermal absorption may be useful to achieve the warm-up and or temperature uniformity design criteria. In other words, the pattern of the insulator layer and/or the absorber layer may be designed to achieve a specified thermal warm-up time and/or temperature variation of the shell surface.

Figure 2C:
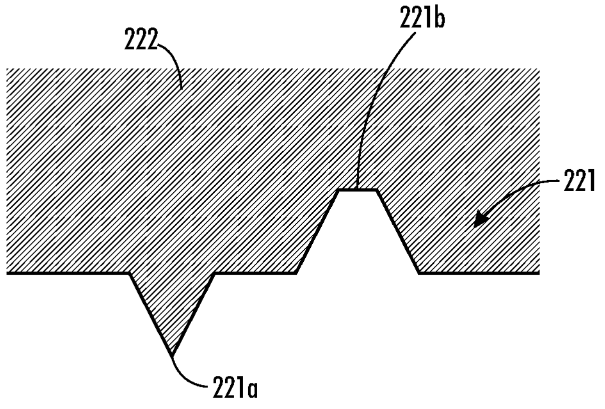
FIG. 2C illustrates a close up of the surface texture of the shell of a composite drum as disclosed herein.

As shown in FIGS. 2A and 2C, a release layer 222 can be disposed on the shell surface 221 of the composite drum 201. The release layer 222 may comprise one or more release oils, such as fluorinated oils, mineral oils, silicone oils, or other certain functional oils in order to maintain good release properties of the drum 201 and thus to support the transfer of the printed image onto the final print medium. Interaction between the surface 221 and the release layer 222 affects the transferred image. For example, when the release layer 222 comprises oils, the surface roughness and/or surface texture of the shell 220 affects the oil consumption rate on the drum surface. Specifically, while a certain level of surface texture is desirable, too much texture may increase oil consumption. The increased oil consumption in turn increases operational costs and image quality of the marking system. On the other hand, too little surface texture can also degrade the printed image quality. Example embodiments disclose a composite drum assembly that includes a core and shell as discussed above, wherein the surface of the shell has a texture useful for solid ink marking systems, e.g. ink jet printers. Due to the surface texture of the shell surface, surface wetting, e.g., by a release oil such as silicon oil, and/or release oil transferring to prints, can be reduced or eliminated.

FIG. 2C illustrates a portion of the shell surface 221 having surface structures 221*a*, 221*b* that contribute to the texture or topography of the surface 221. For example, the surface structures 221*a*, 221*b* can include periodic and/or ordered nano-, micro-, or nano-micro-surface structures. In exemplary embodiments, the disclosed surface texture can include protrusive features 221*b* and/or intrusive features 221*a*.

For example, the texture of the shell surface 221 can include a plurality of pit structures, dimples and/or other intrusive structures. In some embodiments, the exemplary pit structures can be defined and separated by pit protuberances. In various embodiments, the pit structures and/or pit protuberances can have various cross-sectional shapes, such as, for example, square, rectangle, circle, star, or any other suitable shape. In various embodiments, the size and shape of the pit structures and/or pit protuberances can be arbitrary or irregular.

The surface texture of the shell surface 221 can be characterized by amplitude parameters, slope parameters, bearing ratio parameters, etc. Among those parameters, Ra denotes an arithmetic average of absolute values of the roughness profile ordinates; Rp denotes a max height of any peak to a mean line of the roughness within one sampling length; and bearing area curve (BAC) denotes a plot of bearing area or bearing length ratio at different cut depths or heights of the surface's general form. Mathematically, the bearing area curve is the cumulative probability density function of the surface profile's height (or cut depth) and can be calculated by integrating the profile trace. It is believed that the peak height and/or bearing area are significant indicators of the oil consumption rate of the aluminum surfaces. For example, absent attainment of the bearing area or Rp values as disclosed herein may result in undesired oil consumption rates, even if other values of typical surface texture measurements are equivalent for the aluminum surfaces.

Surface characterization can be affected by the measuring techniques including the instruments, software, and/or electrical setup that are used for the measurement. For example surface texture parameters discussed herein can be measured using a Zeiss Surfcom 130A profilometer available from Ford Tool and Gage (Milwaukee, Wis.) set to the following parameters: evaluation length—4 mm; speed—0.3 mm/s; cutoff—0.8 mm; cutoff type—Gaussian; range—±40.0 μm; tilt—straight; cutoff filter ratio—300; Pc upp-L—0.600 μm; Pc low-L—0.000 μm; method of BAC curve cut level—absolute; method of BAC curve—DIN4776 (ISO 13565); output method of Rmr—individual value; probe tip—2 μm 60 degree conical diamond; tilt correction—least square straight.

The shell surface 221 of composite drum assemblies disclosed herein may have surface texture or topography having an average surface roughness (Ra), for example, ranging from about 0.05 microns to about 0.7 microns, or from about 0.1 microns to about 0.6 microns, or from about 0.2 microns to about 0.4 microns. The composite drum assemblies disclosed herein can have aluminum shells having surfaces with a bearing area ranging from about 2% to about 100%, or ranging from about 5% to about 95% at a cut depth ranging from about 0.1 microns to about 1 micron, or ranging from about 0.1 microns to about 0.7 microns. For example, the exemplary composite drum assemblies can include aluminum shells with surfaces that have a bearing area ranging from about 2% to about 7% at a cut depth of about 0.1 microns; a bearing area ranging from about 7% to about 46% at a cut depth of about 0.2 microns; a bearing area ranging from about 18% to about 74% at a cut depth of about 0.3 microns; a bearing area ranging from about 32% to about 82% at a cut depth of about 0.4 microns; a bearing area ranging from about 47% to about 86% at a cut depth of about 0.5 microns; a bearing area ranging from about 60% to about 89% at a cut depth of about 0.6 microns, and/or a bearing area ranging from about 70% to about 95% at a cut depth of about 0.7 microns.

The shell surface 221 of the composite drum assembly can have an average pit density ranging from about 100 per millimeter square to about 40,000 per millimeter square, or ranging from about 1000 per millimeter square to about 30,000 per millimeter square, or ranging from about 2500 per millimeter square to about 25,000 per millimeter square. In some embodiments, the image drum 120 can have an average pit size or a mean pit diameter, for example, ranging from about 0.1 microns to about 25 microns, or from about 0.1 micron to about 20 microns, or from about 2 microns to about 15 microns.

In various embodiments, the surface texture/topography of the shell surface 221 of the disclosed composite drum assemblies can have hierarchical surface texture with periodical structures on two or more scales. Examples can include fractal and self-affined surfaces that refers to a fractal one in which its lateral and vertical scaling behavior is not identical but is submitted to a scaling law.

In some embodiments, the surface texture of the metal shell of a composite drum can be controlled during formation by, for example, controlling metal alloy compositions and crystalline structures, controlling surface treatment chemistries/conditions, etc. of the shell.

The shell 220 of the exemplary composite drum assemblies can be formed from Al-containing alloys having elements including, but not limited to, Aluminum (Al), Manganese (Mn), Iron (Fe), Silicon (Si), Copper (Cu), and Chromium (Cr). In various configurations, an aluminum alloy for forming the composite drum can include, for example, at least about 97% of Aluminum by weight of the shell. In some embodiments, Manganese (Mn) can be used, having about 2% or less by weight of the total aluminum drum. In embodiments, Iron (Fe) can be used, having about 1% or less by weight of the shell.

The shell surface 221 can be treated by, for example, a chemical treatment, a mechanical treatment and/or a combination thereof. The chemical treatment can include an etching process, including a wet or dry etching such as a caustic etching or an acid dip; while the mechanical treatment can include a polishing or a roughening process including, but not limited to, a lapping process, an abrasion blasting process, a buffing process, and/or a turning process.

The base surface texture/topography and therefore the final surface texture/topography of the shell surface 221 can be controlled by various treatments. For example, when an etching process is involved, the etching chemistries and the etching conditions, such as the etching time and the etching temperature, can be controlled to provide a desirable base and then final surface texture for the shell surface 221. In an exemplary embodiment, the etching process can include various different chemicals including acids and bases, for example, sodium hydroxide. The etching temperature can be about 35 degree C. or higher, for example, ranging from about 3 degree C. to about 75 degree C., or higher than 75 degree C. The etching time length can be about 30 seconds or longer, for example, ranging from about 30 seconds to about 200 seconds, or longer than 200 seconds. As a result, the surface texture of the shell surface 221 can be controllably changed.

In some cases, slight differences of aluminum compositions and/or aluminum crystalline structures can change the surface texture of the shell surface 221. For example, 3000 series aluminum such as 3003 type of aluminum drums can all contain about 98% aluminum. However, slight difference between alloy compositions can have effects on crystalline structure, size and/or orientation, size of insoluble domains in the alloy, etc. during the formation of the shell. For example, for 3003 aluminum shells, one shell can have a more suitable oil consumption (OC) rate and better print quality due to its surface texture having high pit density and small pit sizes as compared with the other shell.

The chemically and/or mechanically treated aluminum shell can then be anodized to conformally form a layer of aluminum oxide and to provide a surface hardness for the aluminum shell. For example, the aluminum oxide layer can have a thickness ranging from about 2 μm to about 30 μm, or ranging from about 5 μm to about 25 μm, or ranging from about 8 μm to about 20 μm. Any known anodization process can be used in accordance with various embodiments of the present teachings.

Optionally, a sealing process can be used following the anodization process of the aluminum shell. In some embodiments, various sealants and their combinations can be used to fill pores or holes in the anodized aluminum shell. Such pores or holes can be created from the anodization process, for example, and can have an average size ranging from about 5 nanometers to about 500 nanometers, or ranging from about 5 nanometers to about 200 nanometers, or ranging from about 50 nanometers to about 100 nanometers.

In some embodiments, the shell surface 221 can be sealed with a polymer sealant having a low surface energy. The polymer sealant can include, for example, polytetrafluoroethylene. Alternatively, the anodized aluminum shell can be sealed with a metal fluoride sealant including, for example, nickel fluoride.

Following the anodization process and/or the optional sealing process, a secondary treatment can be performed on the resultant surface 221 of the shell 220. In embodiments, the secondary treatment can include a mechanical polishing or a roughening process to fine-tune (e.g., to increase or decrease surface roughness from the base surface roughness) the surface texture. In addition, the secondary treatment following the anodization process can remove impurities on the shell surface 221, which may have been deposited from previous processes.

After the secondary treatment, the treated aluminum oxide layer can have a thickness ranging from about 1 μm to about 25 μm, or ranging from about 2 μm to about 22 μm, or ranging from about 5 μm to about 18 μm.

Systems, devices or methods disclosed herein may include one or more of the features, structures, methods, or combinations thereof described herein. For example, a device or method may be implemented to include one or more of the features and/or processes described below. It is intended that such device or method need not include all of the features and/or processes described herein, but may be implemented to include selected features and/or processes that provide useful structures and/or functionality.

Various modifications and additions can be made to the preferred embodiments discussed above. Accordingly, the scope of the present disclosure should not be limited by the particular embodiments described above, but should be defined only by the claims set forth below and equivalents thereof.

What is claimed is:

1. A system comprising:

a drum assembly comprising:

a composite print drum including an outer shell having a thermal conductivity greater than about 200 W/m-K and a thickness in a range of about 1.5 mm to about 15 mm disposed around a hollow core having a thermal conductivity less than about 10 W/m-K;

a heater configured to heat the composite print drum;

a print head comprising ink jets configured to selectively eject ink toward the print drum according to predetermined pattern; and a transport mechanism configured to provide relative movement between the print drum and the print head.

2. The system of claim 1, wherein the heater comprises a radiant heater disposed within the hollow core.

3. The system of claim 2, wherein the heater comprises a filament heater.

4. The system of claim 2, wherein the heater comprise a halogen bulb.

5. A system comprising:

a drum assembly comprising:

a composite print drum including an outer shell having a thermal conductivity greater than about 200 W/m-K and a thickness in a range of about 1.5 mm to about 15 mm disposed around a hollow core having a thermal conductivity less than about 10 W/m-K;

a heater configured to heat the composite print drum, wherein the heater comprises a radiant heater disposed within the hollow core;

a print head comprising ink jets configured to selectively eject ink toward the print drum according to predetermined pattern;

a transport mechanism configured to provide relative movement between the print drum and the print head; and a radiation absorbent layer configured to absorb radiation produced by the radiant heater, the radiation absorbent layer disposed between the hollow core and the outer shell.

6. The system of claim 5, wherein the radiation absorbent layer comprises black chromium, black high temperature paint, anodized aluminum or infrared absorbing adhesive.

7. The system of claim 1, wherein the drum assembly further comprises a thermally insulating layer disposed between the hollow core and the outer shell.

8. The system of claim 7, wherein the thermally insulating layer comprises an aerogel.

9. The system of claim 7, wherein the thermally insulating layer has a thermal conductivity less than about 0.03 W/m-K.

10. The system of claim 1, wherein the hollow core is substantially transmissive to radiation having a wavelength in a range of about 1000 to about 5000 nm.

11. The system of claim 1, wherein the hollow core has an outer diameter in a range of about 100 mm to about 1000 mm.

12. The system of claim 1, wherein the hollow core has a wall thickness in a range of about 4 mm to about 30 mm.

13. The system of claim 1, wherein the drum assembly is configured to provide an increase in temperature of the outer shell of about 30 degrees C. in less than about 100 seconds and to maintain a temperature variation of less than about 0.01 degrees C. per mm across an outer surface of the outer shell.

14. A system comprising:

a drum assembly comprising:

a composite print drum including an outer shell having a thermal conductivity greater than about 200 W/m-K and a thickness in a range of about 1.5 mm to about 15 mm disposed around a hollow core having a thermal conductivity less than about 10 W/m-K; and a heater configured to heat the composite print drum;

a print head comprising ink jets configured to selectively eject ink toward the print drum according to predetermined pattern; and a transport mechanism configured to provide relative movement between the print drum and the print head;

wherein an outer surface of the outer shell has a surface texture having an average surface roughness ranging from about 0.05 microns to about 0.7 microns, and a bearing area ranging from about 2% to about 100% at a cut depth ranging from about 0.1 microns to about 1 micron; wherein a relationship between the bearing area and the cut depth is selected from one or more sets comprising: the bearing area ranging from about 7% to about 46% at the cut depth ranging from about 0.1 microns to about 0.2 microns; the bearing area ranging from about 18% to about 74% at the cut depth ranging from about 0.2 microns to about 0.3 microns; the bearing area ranging from about 32% to about 82% at the cut depth ranging from about 0.3 microns to about 0.4 microns; the bearing area ranging from about 47% to about 86% at the cut depth ranging from about 0.4 microns to about 0.5 microns; the bearing area ranging from about 60% to about 89% at the cut depth ranging from about 0.5 microns to about 0.6 microns; and the bearing area ranging from about 70% to about 95% at the cut depth ranging from about 0.6 microns to about 0.7 microns.

15. The system of claim 14, wherein the surface texture comprises an average maximum profile peak height of less than about 0.6 microns.

16. The system of claim 14, wherein the surface texture comprises an average maximum profile peak height ranging from about 0.2 microns to about 0.6 microns.

17. The system of claim 14, wherein the surface texture has an average pit size ranging from about 0.1 microns to about 20 microns, and an average pit density ranging from about 1000 per millimeter square to about 30,000 per millimeter square.

18. A print drum subassembly comprising:

a composite print drum including an aluminum outer shell having a wall thickness in a range of about 1.5 mm to about 15 mm and a thermal conductivity greater than about 200 W/m-K disposed around a hollow glass cylinder having wall thickness in a range of about 4 mm to about 30 mm and having a thermal conductivity less than about 10 W/m-K; and a radiant heater arranged within the hollow glass cylinder.

19. The print drum subassembly of claim 18, wherein the print drum subassembly further comprises at least one of a radiation absorbent layer and a thermally insulating layer disposed between the hollow glass cylinder and the outer shell.

20. A print drum subassembly comprising:

a composite print drum including an aluminum outer shell having a wall thickness in a range of about 1.5 mm to about 15 mm and a thermal conductivity greater than about 200 W/m-K disposed around a hollow glass cylinder having wall thickness in a range of about 4 mm to about 30 mm and having a thermal conductivity less than about 10 W/m-K, wherein an outer surface of the outer shell has a surface texture having an average surface roughness ranging from about 0.05 microns to about 0.7 microns, and a bearing area ranging from about 2% to about 100% at a cut depth ranging from about 0.1 microns to about 1 micron; wherein a relationship between the bearing area and the cut depth is selected from one or more sets comprising: the bearing area ranging from about 7% to about 46% at the cut depth ranging from about 0.1 microns to about 0.2 microns; the bearing area ranging from about 18% to about 74% at the cut depth ranging from about 0.2 microns to about 0.3 microns; the bearing area ranging from about 32% to about 82% at the cut depth ranging from about 0.3 microns to about 0.4 microns; the bearing area ranging from about 47% to about 86% at the cut depth ranging from about 0.4 microns to about 0.5 microns; the bearing area ranging from about 60% to about 89% at the cut depth ranging from about 0.5 microns to about 0.6 microns; and the bearing area ranging from about 70% to about 95% at the cut depth ranging from about 0.6 microns to about 0.7 microns; and a radiant heater arranged within the hollow glass cylinder.

* * * * *